(12) United States Patent
Sotokawa et al.

(10) Patent No.: US 6,554,491 B2
(45) Date of Patent: Apr. 29, 2003

(54) OPTICAL MODULE

(75) Inventors: Hideo Sotokawa, Yokohama (JP); Toshimasa Miura, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 258 days.

(21) Appl. No.: 09/740,610

(22) Filed: Dec. 18, 2000

(65) Prior Publication Data

US 2001/0043783 A1 Nov. 22, 2001

(30) Foreign Application Priority Data

Feb. 22, 2000 (JP) ........................................ 2000-050452

(51) Int. Cl.⁷ ................................................ G02B 6/36
(52) U.S. Cl. ............................. 385/88; 385/92; 385/94; 385/131
(58) Field of Search ................... 385/88–94, 129–132, 385/141–145, 14, 49, 50

(56) References Cited

U.S. PATENT DOCUMENTS 6,075,911 A * 6/2000 Goto ............................ 385/31
6,229,949 B1 * 5/2001 Ido et al. ..................... 385/145
6,269,209 B1 * 7/2001 Terada et al. .................. 385/51
6,435,734 B2 * 8/2002 Okada et al. ................... 385/88
2002/0081056 A1 * 6/2002 Kaneko et al. ................ 385/14

FOREIGN PATENT DOCUMENTS

| JP | 09-021920 | 1/1997 |
| JP | 09-311232 | 12/1997 |
| JP | 10-288717 | 10/1998 |
| JP | 11-133254 | 5/1999 |

* cited by examiner

*Primary Examiner*—Hemang Sanghavi
(74) *Attorney, Agent, or Firm*—Townsend and Townsend and Crew LLP

(57) ABSTRACT

The present invention provides an optical module and apparatus and forming method that can reduce problems in the setting of a silicone-based resin. In one embodiment of the present invention an optical module is provided. The optical module includes: an optical waveguide formed from a first resin, the first resin having fluorine; an intermediary layer above the optical waveguide; and a silicone-based resin layer above the intermediary layer. The intermediary layer may include: a metal, a dielectric, an inorganic compound, or a second resin having a fluorine content of less than 10 percent.

41 Claims, 4 Drawing Sheets

OPTICAL MODULE

CROSS-REFERENCES TO RELATED APPLICATIONS

This application is related to and claims priority from Japanese Patent Application No. 00-050452, filed on Feb. 22, 2000.

BACKGROUND OF THE INVENTION

The present invention generally relates to the field of optical modules and more particularly to an optical module with an optical waveguide formed using a resin containing fluorine.

Recent years have seen active research and development of optical modules that use polymer-based optical waveguides, which provide lower costs compared to quartz-based optical waveguides. Of these, optical waveguides that use polyamides as the polymer material have good heat resistance and reliability, providing advantages in terms of process applicability and practicality. Furthermore, the use of fluorine reduces C—H bonding, allowing optical transmission loss to be reduced. Examples of this conventional technology include Japanese laid-open patent publication number Hei 9-21920, Japanese laid-open patent publication number Hei 10-288717, Japanese laid-open patent publication number Hei 11-133254.

In order to reduce transmission loss in the 1.3–1.6 micrometer wavelengths used in optical communications, fluorine is introduced in these polymer-based optical waveguides to reduce the C—H bonding, which causes this transmission loss. Standard optical waveguides are formed, starting from the lowest layer, from a lower cladding layer, a core layer, and an upper cladding layer. Fluorine is used not only in the core layer but also in the upper and lower cladding layer. This is because some light leaks out from the core layer to the cladding layer, thus making loss in the cladding layer an issue.

Silicone-based resins are often used as the adhesives and encapsulants used in optical modules since they can limit stress with low elasticity and also since water absorption is low. In these cases, the surface of the optical waveguide substrate, the optical elements, and the like of the optical module are cleaned before the silicone-based resin in applied, thus improving the reliability of the adhesion between these elements and the silicone-based resin. This ensures that the module will operate in a reliable and stable manner.

Cleaning is performed, for example, by exposing the optical module to ultraviolet light or by performing plasma ashing. Alternatively, the optical waveguide and the optical fibers can be connected using an ultraviolet-setting adhesive. In these cases as well, the surface of the optical waveguide is exposed to ultraviolet light to set the ultraviolet-setting adhesive.

According to our research, if the upper cladding layer material is formed from a resin containing at least 10% of fluorine by weight, this surface is exposed to ultraviolet light or to plasma ashing, silicone-based resin is applied to the surface and set, then there is inhibition to the setting of the silicone-based resin. More specifically, if the upper cladding layer material contains at least 10% fluorine, putting a needle to the silicone-based resin and then moving it away after the silicone-based resin is set will cause filaments to be drawn. It was also found that actions such as the tilting optical module will cause the silicone-based resin to flow.

Thus, there is a need to provide an optical module that can limit inhibitions to the setting of silicone-based resin.

SUMMARY OF THE INVENTION

The present invention provides an optical module and apparatus and forming method that can reduce problems in the setting of a silicone-based resin. In one embodiment of the present invention an optical module is provided. The optical module includes: an optical waveguide formed from a first resin, the first resin having fluorine; an intermediary layer above the optical waveguide; and a silicone-based resin layer above the intermediary layer. The intermediary layer may include: a metal, a dielectric, an inorganic compound, or a second resin having a fluorine content of less than 10 percent.

Another embodiment of the present invention includes an intermediate layer interposed between an upper cladding layer and a silicone-based resin. The intermediate layer is formed, for example, from at least one item selected from the following list: a metallic or non-metallic inorganic layer; a resin layer not containing fluorine; and a resin layer with a low fluorine content.

In one embodiment of the present invention a method for producing an optical module is provided. The method includes: forming an optical waveguide having a resin, the resin having fluorine. Next, forming above said optical waveguide, an intermediate layer; and lastly, forming a covering layer above the intermediate layer, the covering layer having a silicone-based resin. The intermediate layer is selected from a group including a metal, a dielectric, an inorganic compound, a second resin having a fluorine content of less than 10 percent or any combination thereof.

More specifically, for example, an optical module includes an optical waveguide formed from a resin containing at least some fluorine. A silicone-based resin is present in at least part of an upper section of the optical waveguide. A metal film is interposed between the optical waveguide and the silicone-based resin.

According to another embodiment of the present invention, the metal film is formed from at least one type of metal selected from the group of: Al, Ti, Ta, Cr, Mo, W, Mn, Fe, Ni, Cu, Pt, and Au.

According to another embodiment of the present invention, an optical module includes an optical waveguide formed from a resin containing at least some fluorine. A silicone-based resin is present in at least part of an upper section of the optical waveguide. An inorganic film is interposed between the optical waveguide and the silicone-based resin.

The inorganic film is formed from at least one material selected from the group of: Si, $SiO_2$, $Si_3N_4$, $Ta_2O_5$, and $Al_2O_3$.

According to another embodiment of the present invention, an optical module includes an optical waveguide formed from a resin containing at least some fluorine. A silicone-based resin is present in at least part of an upper section of the optical waveguide. A resin layer not containing fluorine is interposed between the optical waveguide and the silicone-based resin.

According to another embodiment of the present invention, an optical module includes an optical waveguide formed from a resin containing at least some fluorine. A silicone-based resin is present in at least part of an upper section of the optical waveguide. A resin layer with a fluorine content of no more than 5% total weight is interposed between the optical waveguide and the silicone-based resin.

According to another embodiment of the present invention, the resin containing at least some fluorine is a polyamide.

According to another embodiment of the present invention, the resin layer containing no fluorine is a polyamide formed from a repeating unit represented by the chemical formula below (Chemical Formula 1).

(In the formula, R1 is at least one of the tetravalent organic groups selected from the set shown below (Chemical Formula 2), and R2 is at least one of the divalent organic groups selected from the set shown below (Chemical Formula 3).)

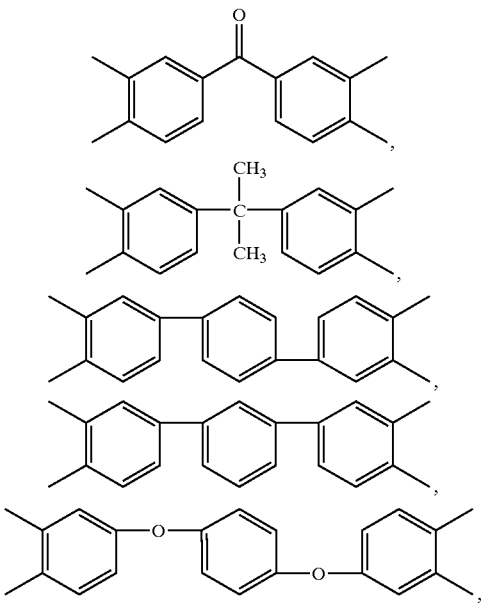

[Chemical Formula 2]

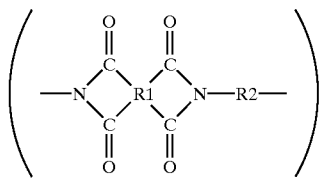

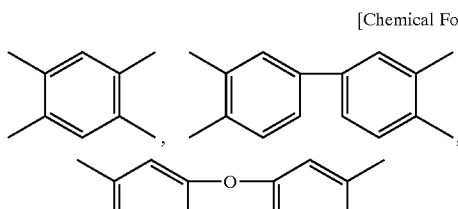

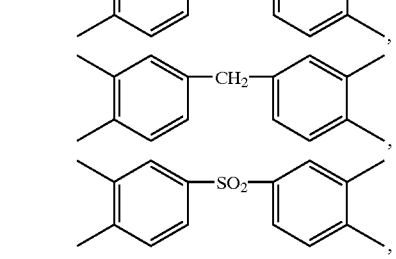

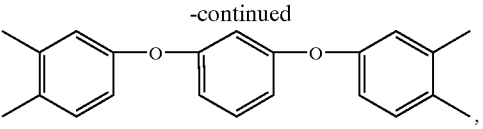

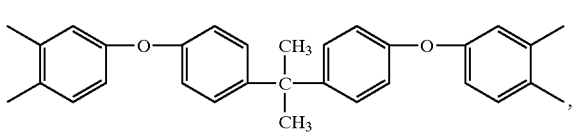

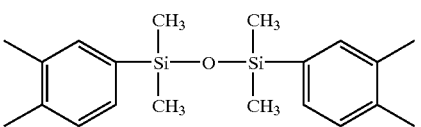

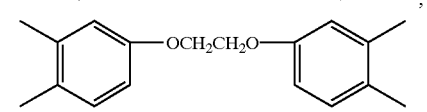

[Chemical Formula 3]

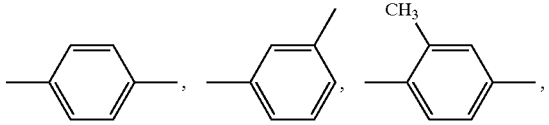

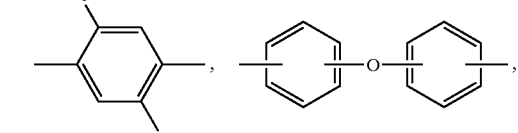

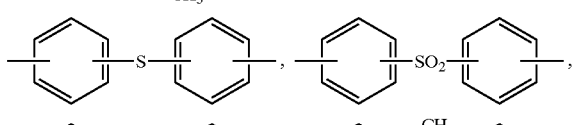

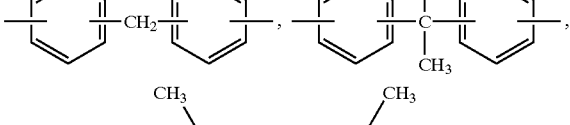

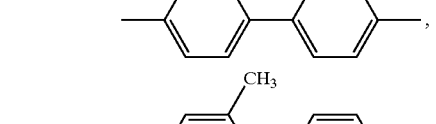

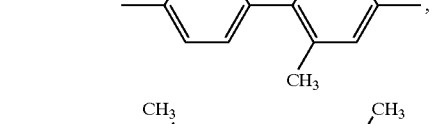

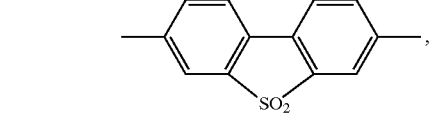

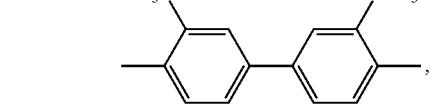

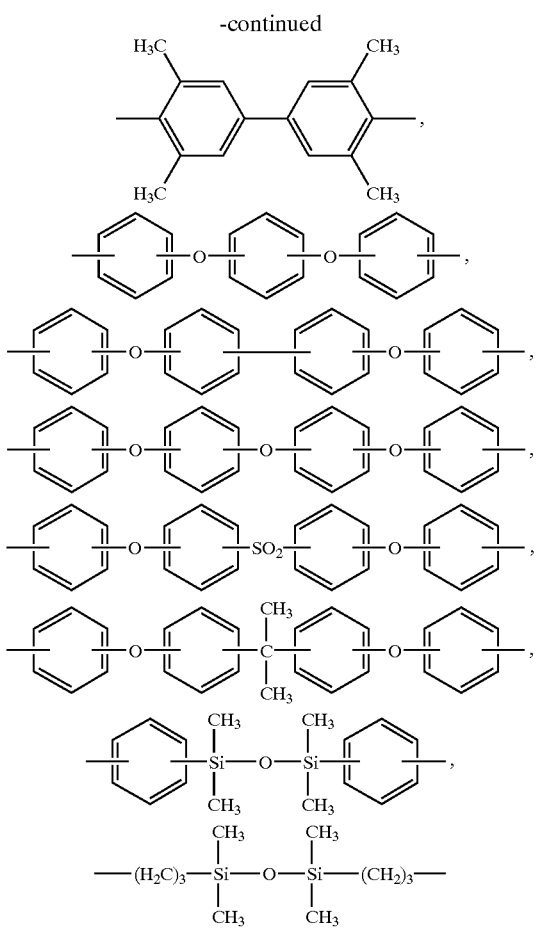

It is believed that hardening is obstructed in the conventional technology because when ultraviolet exposure or plasma ashing is applied on material containing fluorine, some of the groups with which fluorine is associated are exposed at the surface in an activated state. This results in interaction with the setting catalysts in the silicone-based resin, making it more difficult for the silicone-based resin to harden. Alternatively, it may be that some sort of action takes places in the material containing fluorine that tends to expose groups that interact with the setting catalysts in the silicone-based resin at the surface, thus making the silicone-based resin more difficult to harden.

However, by interposing an intermediate layer between the cladding layer and the silicone-based resin, these interactions could be restricted, and the silicone-based resin could be properly set. In other words, by providing an intermediate layer, the inhibitions to the hardening of the silicone-based resin could be restricted even if the surface is cleaned as described above.

The intermediate layer can be formed from any material that is not a resin containing 10% fluorine or greater and that can assure adequate heat resistance for standard reliability tests for 2000 hours at 85 C, the maximum temperature. For example, metal films, dielectrics, or resin containing no fluorine or no more than 5% fluorine can be used, although the present invention is not restricted to these.

The resin layer containing no fluorine or no more than 5% total weight of fluorine can be any resin that can assure adequate beat resistance for standard reliability tests for 2000 hours at 85 C, the maximum temperature. For example, the material can be any of the following: thermosetting or ultraviolet-setting epoxy-based resin or acrylic-based resin; polyetherimide-based resin, polysulfone-based resin; polyethersulfone-based resin; polyvinylacetal-based resin; polyimide-based resin; polyimide-based resin; polyether ether ketone-based resin; a positive or negative photosensitive resist material or a base polymer of these; polyimide-based resin; or the like. Of these, polyimide-based materials provide wide production process margins since they generally have good chemical resistance properties. Also, since heat-resistance and climate-resistance properties are good, additional advantages such as good reliability can be provided.

These and other embodiments of the present invention are described in more detail in conjunction with the text below and attached figures.

DESCRIPTION OF THE SPECIFIC EMBODIMENTS

The following is a description of the embodiments of the present invention.

Figure 1:
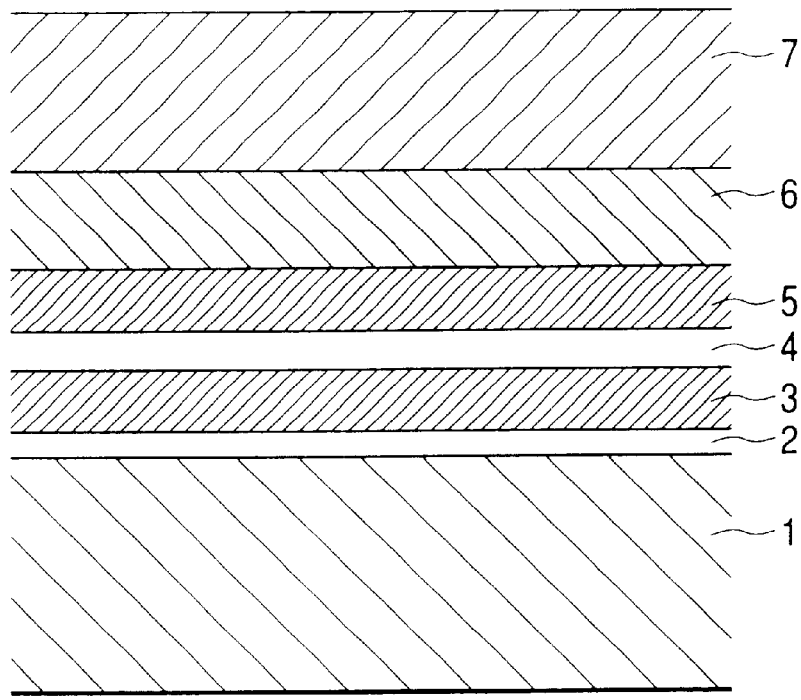
FIG. 1 shows a cross-section drawing including an optical waveguide section of an optical module according to an embodiment of the present invention.

FIG. 1 shows a cross-section of an embodiment of the present invention. The figure shows a silicon substrate 1, an SiO$_2$ layer (silicon oxide film) 2, a lower cladding layer 3, a core layer 4, an upper cladding layer 5, an intermediate layer 6, and a silicone-based resin 7. The lower cladding layer 3, the core layer 4, and the upper cladding layer 5 use a material containing fluorine and formed to reduce C—H bonds, which cause optical transmission loss. The core layer 4 and the cladding layer serve as an optical waveguide. The silicone-based resin 7 is used as a sealing material for the optical module and serves to ease stress generated in the optical module.

Table 1 shows the materials (polyimide) used to form the lower cladding layer 3, the core layer 4, and the upper cladding layer 5 of the optical waveguide.

TABLE 1

Material composition (R11 and R12 from Chemical Formula 11)

| No | R11 | R12 |
|---|---|---|
| 11 | | 90:10 mole ratio between 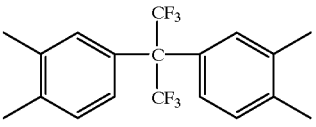 and 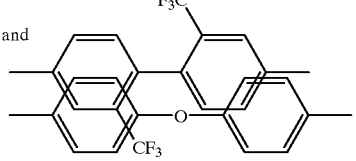 |
| 12 | 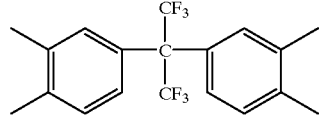 | 70:30 mole ratio between 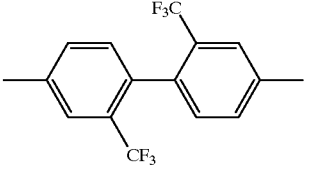 and 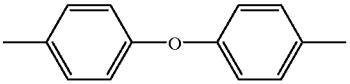 |

In FIG. 1, the lower cladding layer 3 and the upper cladding layer 5 are formed from the repeating unit shown in the formula below (Chemical Formula 11). For R11 and R12, the structures shown in No. 11 of Table 1 are used. The core layer 4 is formed from the repeating unit shown in the formula below (Chemical Formula 11). For R11 and R12, the structures shown in No. 12 of Table 1 are used.

[Chemical Formula 11]

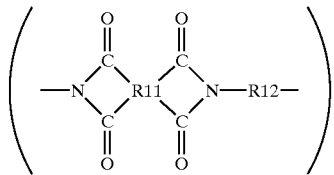

(化11)

The following is a description of how the optical module shown in FIG. 1 is produced.

First, the thermal oxide film ($SiO_2$ film) 2 is formed with a thickness of about 1 micron on the silicon substrate 1, which has a thickness of about 1 mm.

Next, the material indicated in No. 11 of Table 1, represented by the formula shown above (Chemical Formula 11), is used to form the lower cladding layer 3. On top of this, the material indicated by No. 12 is used to form the core layer 4. On top of this, the material indicated by No. 11 is used to form the upper cladding layer 5. As described above, these materials are polyimides containing fluorine. Each of these layers are formed by applying a varnish of polyamic acid solution using a spin-coating method or the like. The solution, which is the precursor for the layer, is then heated at least 300 C to form the layer. With the core layer 4, appropriate patterning is applied after being heated. The upper cladding layer 5 is applied so that it covers the core layer 5.

Next, the intermediate layer 6 is formed by sputtering Cr at a thickness of about 0.05 microns.

Next, a low-pressure mercury lamp is used to apply ultraviolet light at 10 mW/cm2 (measured at 254 nm) for five minutes over the entire surface of the optical module, including the intermediate layer 6 formed on the optical waveguide. The surface is then cleaned.

Next, a thermosetting silicone-based resin 7 is applied to the cleaned surface and heated at least 100 C, causing the silicone-based resin 7 to completely set.

In the conventional technology, where the intermediate layer 6 is not formed, the silicone-resin does not properly harden, so that touching the silicone-based resin with a needle would create a filament at the tip of the needle. In this case, the hardening of the resin would result in an almost liquid state, and the tensile modulus of the resin would be close to 0 kPa. However, by forming the intermediate layer 6 as in this embodiment, it was found that the silicone-based resin would have a tensile modulus of 50–1000 kPa depending on the resin material, thus providing a completely hardened state.

Since the intermediate layer 6 is not a resin containing fluorine, the setting of the silicone-based resin is not obstructed even if the surface is cleaned, as described above, using ultraviolet exposure to improve the reliability of the adhesion with the silicone-based resin. Also, although the lower cladding layer 3, the core layer 4, and the upper cladding 5 contain fluorine, they do not come into contact with the silicone-based resin 7 due to the intermediate layer 6. Thus, the setting of the silicone-based resin 7 is not obstructed.

Thus, even if materials containing fluorine are used for the lower cladding layer 3, the core layer 4, and the upper cladding layer 5, the use of the intermediate layer 6 allows the surface to be cleaned using ultraviolet exposure and the reliability of the adhesion with the silicone resin 7 can be maintained. In other words, the negative effect on the hardening of the silicone-based resin caused by ultraviolet exposure is limited. In this description, ultraviolet exposure is used for cleaning. However, it would also be possible to use other methods such as plasma ashing since there is no contact between resin containing fluorine and the silicone resin 7.

In the embodiment described above, Cr is used in the intermediate layer 6, but it would also be used to use metals such as Ti, Ta, Mo, W, Mn, Fe, Ni, Cu, Pt, Au as well as non-metal inorganic material such as Si, $SiO_2$, $Si_3N_4$, $Ta_2O_5$, $Al_2O_3$ while still allowing the silicone-based resin 7 to completely harden and preventing inhibitions to the hardening. Alternatively, the silicone-based resin 7 can completely harden without inhibition when, instead of Cr, a resin that does not contain fluorine or a resin with a fluorine content of no more than 5% the total weight is used, e.g., a thermosetting or ultraviolet-setting epoxy-based resin, an acrylic-based resin, polyetherimide-based resin, polysulfone-based resin, polyethersulfone-based resin, polyvinylacetal-based resin, polyimide-based resin, polyimide-based resin, polyether ether ketone-based resin, a positive or negative photosensitive resist material or a base polymer of these.

If, for the intermediate layer 6, a polyimide-based material shown in No. 21–No. 29 from Table 2, is used instead of Cr in (Chemical Formula 21), i.e., a structure using a repeating unit indicated in (Chemical Formula 21), the silicone-based resin 7 was found to harden completely without inhibition. The materials in No. 21–No. 9 are formed in a layer with a thickness of 1 micron–10 microns by applying a varnish of polyamic acid solution, the antecedent of the these materials, using a spin coating method or the like and heating at a temperature of at least 300 C.

TABLE 2

| | Material composition (R21 and R22 from Chemical Formula 21) |
|---|---|
| No | R21 |
| 21 | 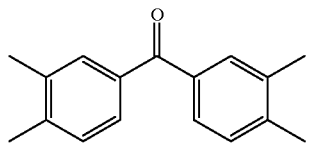 |
| 22 | 1:1 mole ratio between 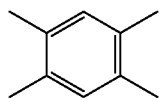 and 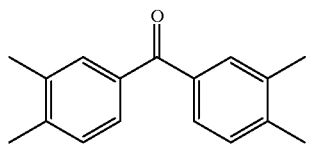 |
| 23 | 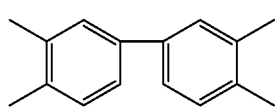 |
| 24 | 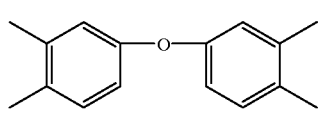 |
| 25 | 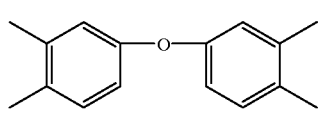 |

TABLE 2-continued
26 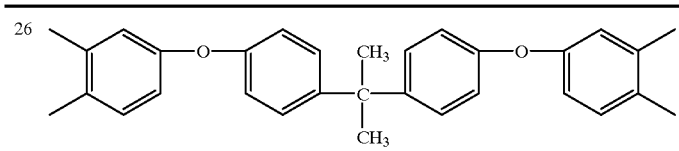
27 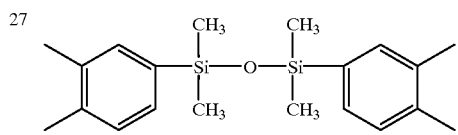
28 85:15 ratio by weight between
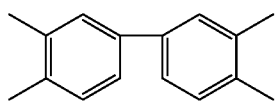
and
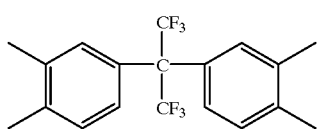
29 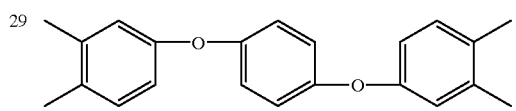
---
No R22
21 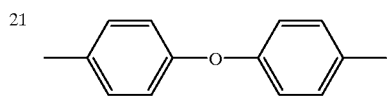
22 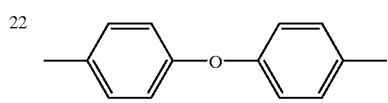
23 1:1 mole ratio between
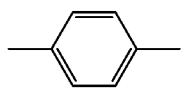
and
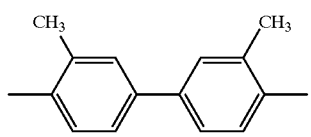
24 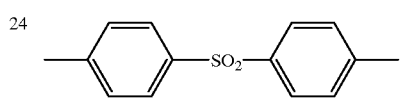
25 1:1 mole ratio between TABLE 2-continued

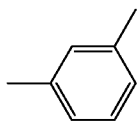

and

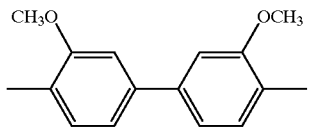

26 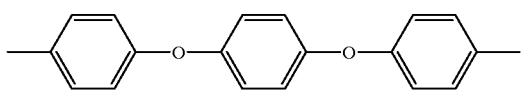

27 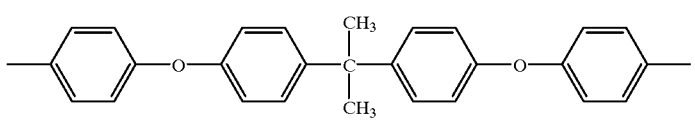

28 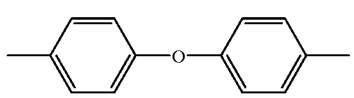

29 85:15 ratio by weight between

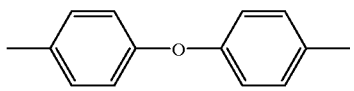

and

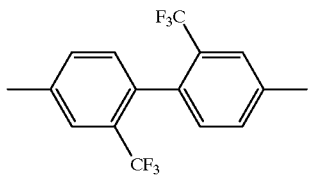

[Chemical Formula 21]

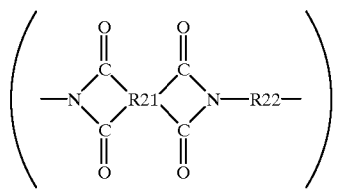

(In the formula, R21 and R22 are the R21 and the R22 shown in Table 2, respectively.) If a resin such as polyimide not containing fluorine is used for the intermediate layer 6, there is no need for special equipment such as vacuum film-forming equipment used to form metal films or inorganic dielectric films, laminators for adhesing film, or injection molding equipment. The production process can be identical or similar to the process used for forming optical waveguides with resin. This has the advantage of allowing a simple production process with simple equipment.

The following is a description of another embodiment of the present invention.

Figure 2A:
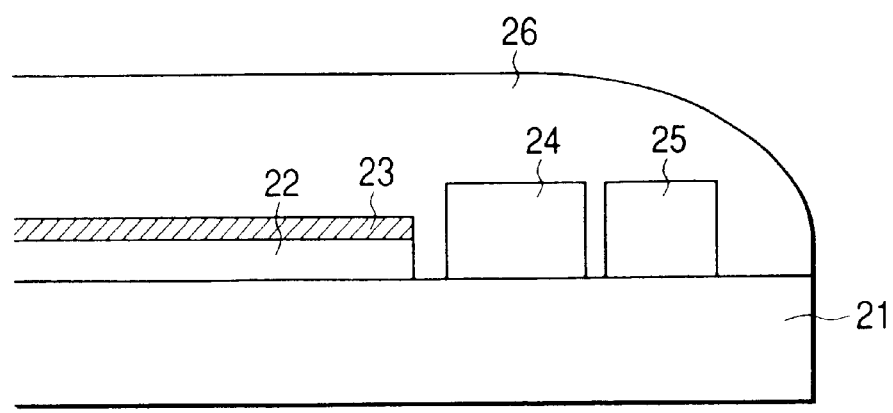
FIG. 2A shows a cross-section drawing including an optical waveguide section of an optical transmission module according to an embodiment of the present invention.

FIG. 2A is a cross-section drawing of a light transmitting module according to an embodiment of the present invention. FIG. 2A shows a silicon substrate 21 on the surface of which is formed an $SiO_2$ layer (silicon oxide film layer) having a thickness of about 1 micron. An optical waveguide 22 is formed with a lower cladding layer, a core layer, and an upper cladding layer, in that order. An intermediate layer 23 is formed from a polyimide not containing fluorine. A laser diode 24 and a photodiode 25 are connected to the silicon substrate 21 using Au—Sn solder. A silicone resin 26 seals these elements. The lower cladding layer, the core layer, and the upper cladding layer are formed from the same materials as the layers shown in FIG. 1.

In the optical module shown in FIG. 2A, the entire module including the optical element surfaces of the laser diode 24 and the photodiode 25 (or 24) is cleaned through ultraviolet exposure. Then, the silicone-based resin 26 is applied and set through heating.

As in the prior description, the presence of the intermediate layer 23 allows the silicone-based resin 26 to set completely with no inhibitions. Also, since the optical element surfaces are cleaned with ultraviolet light, good microscopic adhesion is provided between the optical element surfaces and the silicone-based resin 26, thus assuring reliable operation. For example, when the dark current of the photodiode 25 was measured, it was initially 0.8 nA at a potential of 2 V. The dark current stayed at a low level of 0.9 nA even after testing for 2000 hours at 85 C and 85% RH.

If the intermediate layer 23 is not provided in the optical module shown in FIG. 2A, the entire surface of the upper cladding layer receives direct ultraviolet exposure. This surface comes into direct contact with the silicone-based resin 26, resulting in inhibition to the setting of the silicone-based resin 26. Thus, some of the resin that was initially applied flows away, resulting in a decreased thickness overall. The hardening of the entirety of the silicone-based resin 26 results from a very small amount of catalyst. The catalyst is trapped by interaction with catalyst on the upper cladding layer, which received ultraviolet exposure. As a result, hardening is obstructed not only at the surface of the upper cladding layer but over the entirety of the applied silicone-based resin 26. Furthermore, the adhesion that is supposed to take place during the setting process becomes incomplete at the microscopic level, and microscopic spaces filled with condensation are formed at the boundaries between the silicone-based resin 26 and the optical elements. This reduces the reliability of the operations performed by the optical elements. For example, the dark current of the photodiode 25 was measured. It was initially 0.8 nA at a potential of 2 V, but after testing for 2000 hours at 85 C and 85% RH, the current increased to 2.5 microA, a level not suited for practical use.

Thus, providing the intermediate layer 23 allows adequate adhesion at the boundaries between the silicone-based resin 26 and the optical elements such as the photodiode 25. Also, the dark current can be kept at or below a predetermined level over long period of time.

Figure 2B:
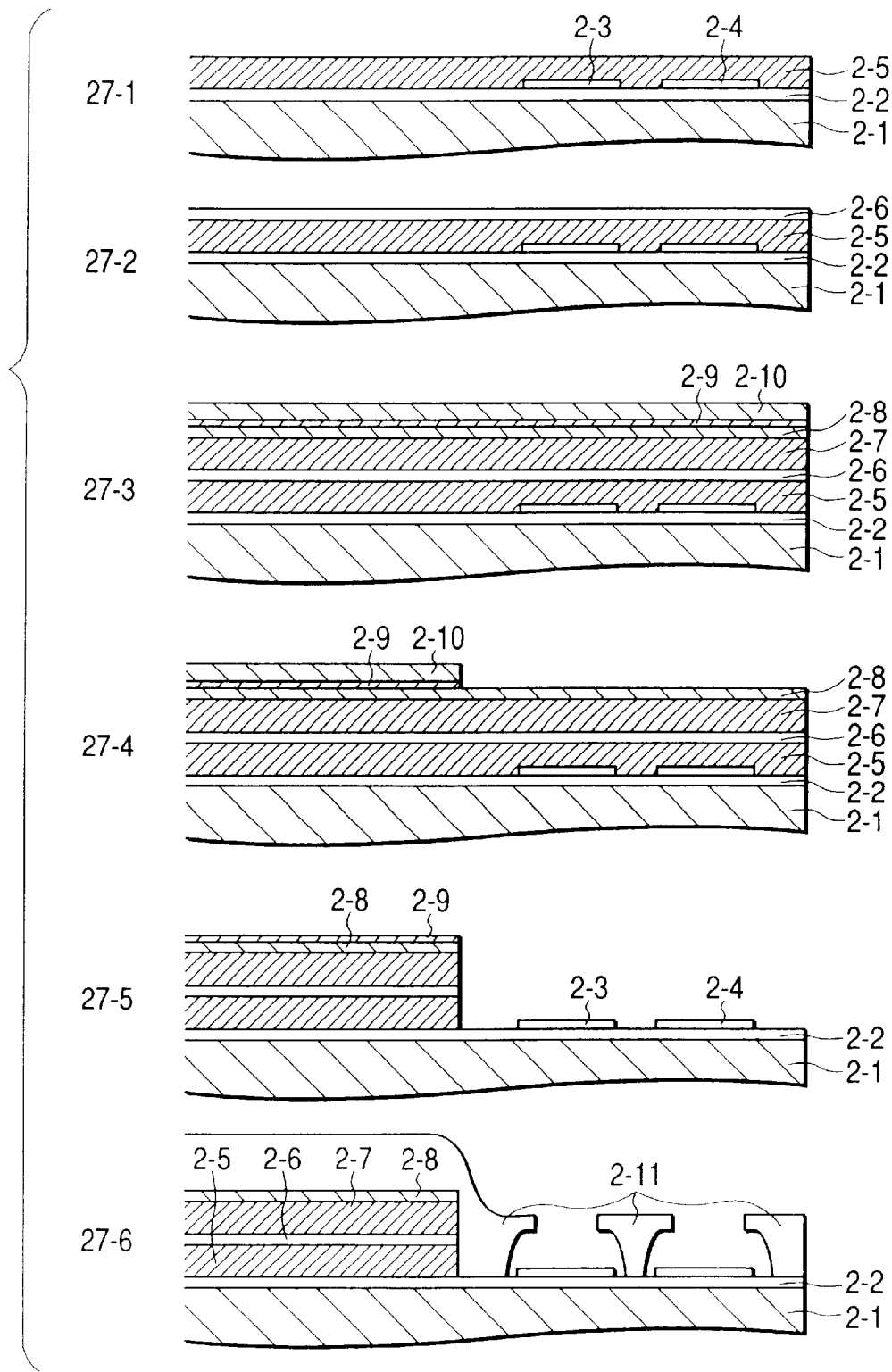
FIG. 2B shows a process for making the optical module of FIG. 2A of an embodiment of the present invention.
Figure 2C:
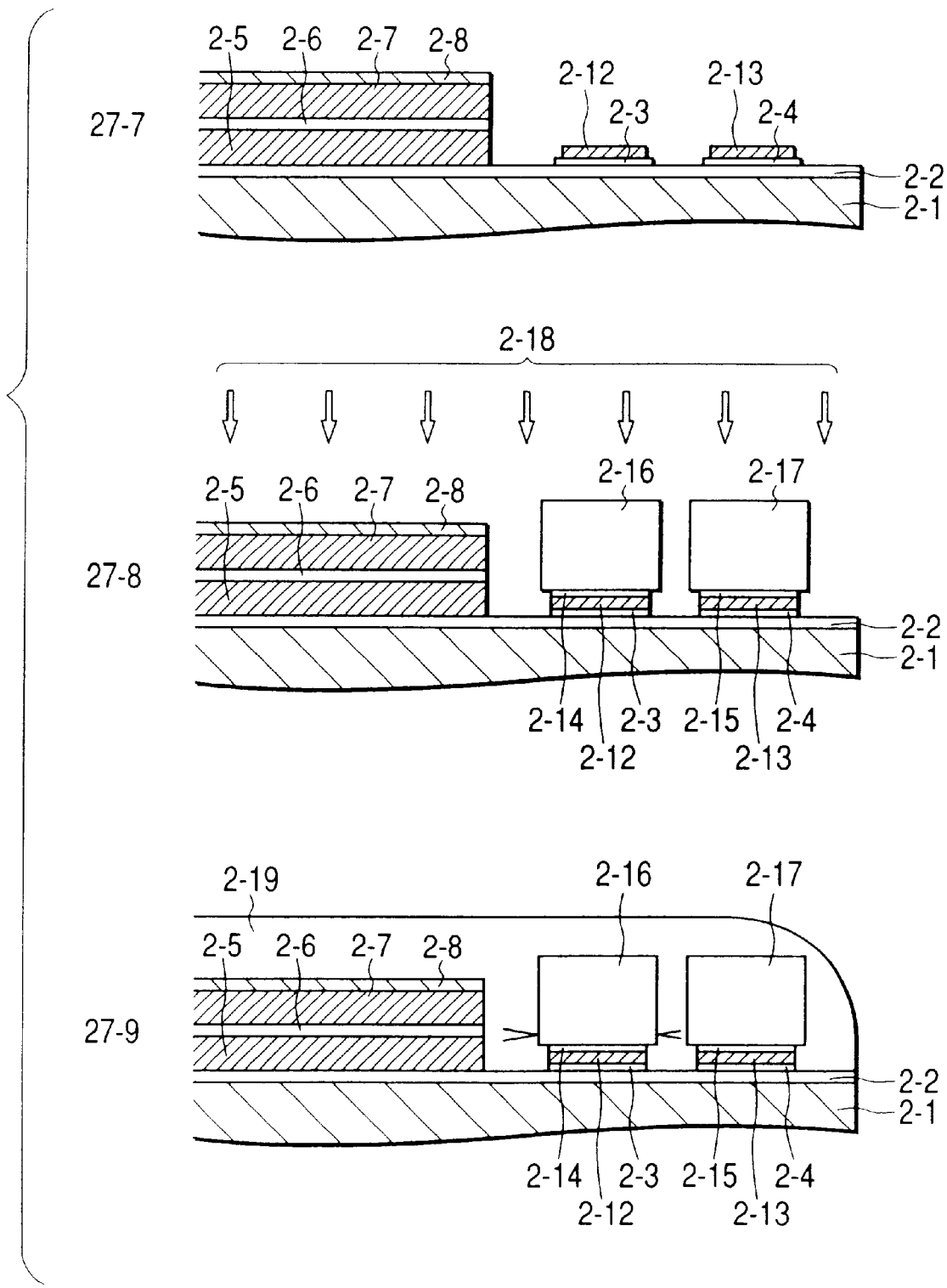
FIG. 2C shows a continuation of the process for making the optical module of FIG. 2A of an embodiment of the present invention.

One example of a process for making a module shown in FIG. 2A is illustrated in FIGS. 2B and 2C in sectional views thereof. This process is as follows:

In step 27-1 a lower layer clad 2-5 is formed above two metal areas 2-3 and 2-4, used for mounting an optical element, and an SiO$_2$ 2-2 layer. The 2-2 layer being formed above a silicon substrate 2-1. Next, a core layer 2-6 is formed on the entire surface and subjected to a desired patterning by a photo-lithography process (step 27-2). At step 27-3, on the entire surface is formed in sequence an upper clad layer 2-7, an intermediate layer 2-8 composed of, for example, an organic substance such as polyimide, a mask material 2-9 such as Al that has a high resistance against a dry etching and is capable of being subjected to a wet etching with acidic chemical liquid, and a photo-resist 2-10. In FIG. 2B, intermediate layer 2-8 corresponds to intermediate layer 23 in FIG. 2A. Then, the mask material 2-9 is etched after exposure and development of the photo-resist 2-10 (step 27-4). Then, a portion, except the area below the mask material 2-9, is removed by a dry etching until the surface of SiO2 (2-2) is exposed (step 27-5). At step 27-6, the mask material 2-9 is removed and the photo-resist 2-11 is formed for patterning. In this case the photo-resist 2-11 provided as a double-layer structure, and material of which lower layer shows a faster dissolution speed than that of upper layer is used. At step 27-7, soldering materials 2-12 and 2-13 are vapor-deposited to peel off the photo-resist 2-11. At step 27-8, the optical elements 2-16 (for example, either a laser diode or a photo-diode) and 2-17 (for example, a photo-diode for a rear optical monitor of a laser diode) are connected to each other by heating through solders 2-12 and 2-13 composed of Au and Sn. In that time, the connected portion of the optical elements 2-16 and 2-17 is formed with metal areas 2-14 and 2-15. Then a radiation of ultraviolet rays or a plasma-ashing 2-18 is performed for the dry cleaning of the entire surface of the optical module including the optical elements 2-16 and 2-17. Finally at step 27-9, there is obtained an optical module composed of the optical elements and an optical wave-guide resin-sealed by coating and thermosetting of a thermosetting silicone resin 2-19 (where silicone resin 2-19 corresponds to silicone resin 26 in FIG. 2A).

In an embodiment of the present invention the process described by FIG. 2A is implemented by a system having a plurality of conventional semiconductor manufacturing machines, where each machine has a computer. Each computer includes a processor, a memory, and a hard disk. Each semiconductor manufacturing machine is controlled by code stored on the hard disk in that computer. In one embodiment the software is distributed across the several manufacturing machines, and includes, an optical waveguide module for forming said optical waveguide from a first resin, said first resin comprising fluorine; an intermediate layer module for forming a film above said optical waveguide; and a sealing resin module for applying a silicone-based resin above said film. Where the film includes a metal, a dielectric, an inorganic compound, a second resin having a fluorine content of less than 10 percent or any combination thereof.

In another embodiment the system includes a plurality of processors, each processor coupled to a computer readable medium for storing code for making a portion of an optical module. Each processor is part of a typical semiconductor manufacturing device for making a portion of the optical module. And the plurality of computer readable media includes: code for forming an optical waveguide from a first resin, said first resin comprising fluorine; code for forming an intermediary layer above said optical waveguide; and code for forming a silicone-based resin layer above said intermediary layer.

Figure 3A:
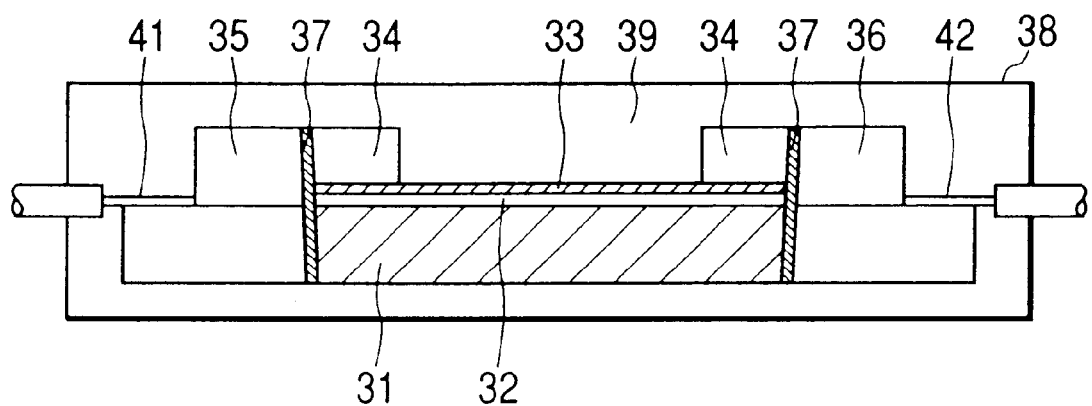
FIGS. 3A and 3B shows a cross-section drawing of optical splitter modules according to an embodiment of the present invention.
Figure 3B:
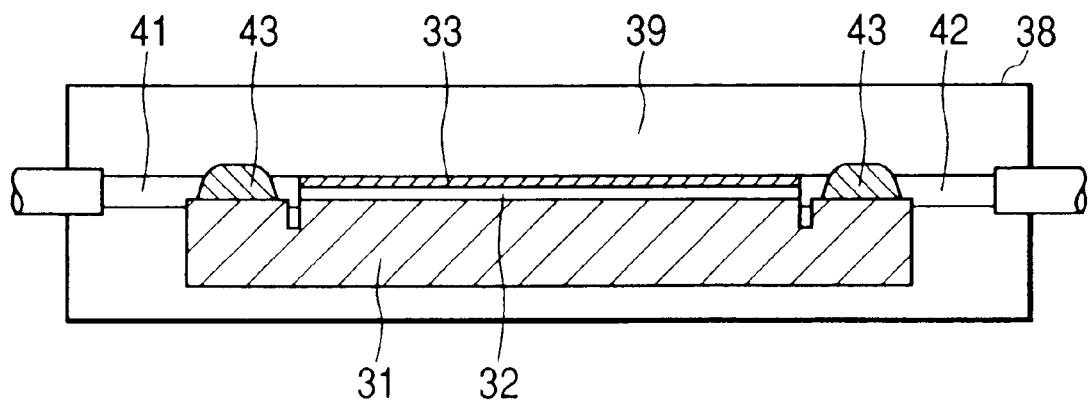

FIGS. 3A and 3B shows an optical splitter module according to another embodiment of the present invention. The figure shows: a silicon substrate 31; an optical waveguide 32 formed from a lower cladding layer, a core layer, and an upper cladding layer, in that order, using materials similar to those used in FIG. 2; an intermediate layer 33 formed from a polyimide not containing fluorine; glass pieces 34, 35, 36; ultraviolet-setting adhesives 37, 43; an aluminum case 38; a silicone-based resin 39. FIG. 3A shows an implementation where optical fibers 41, 42 are held in the glass pieces 35, 36. FIG. 3B shows an implementation where the optical fibers 41, 42 are directly mounted on the silicon substrate. In either case, the light introduced into the optical waveguide 32 from the single optical fiber 41 is split in eight inside the optical waveguide 32 and exits from the eight optical fibers 42. The lower cladding layer, the core layer, and the upper cladding layer used in the optical waveguide 32 are formed from materials similar to those used in the example shown in FIG. 1.

In this embodiment, the optical fibers 41, 42 are adhesed to the optical waveguide 32 by applying the ultraviolet-setting adhesives 37, 43 and exposing the structure to ultraviolet light. Some of the ultraviolet light reaches the intermediate layer 33 on the optical waveguide 32. The optical splitter module is then housed in the case 38 and sealed there by filling the case 38 with the silicone-based resin 39. In some cases, the hardening of the silicone-based resin 39 was incomplete.

Thus, by forming the intermediate layer 33, the silicone-based resin 39 can set completely with no inhibition. As a result, the silicone-based resin 39 will not run out even if the optical splitter module is tilted or turned upside down. In addition to improving humidity resistance of the entire optical splitter module, the silicone-based resin 39 serves to prevent force from being applied directly to the ends of the optical fibers 41, 32 even if external pulling or bending force is applied to the optical fibers. Furthermore, the silicone resin 39 between the optical fibers 41, 42 and the optical waveguide 32 serves as a matching oil that reduces reflection of light.

If the intermediate layer 33 is not used in the structures shown in FIGS. 3A and 3B, the upper cladding layer is directly exposed to ultraviolet light, resulting in obstructed hardening of the silicone-based resin 39. As a result, the silicone-based resin 39 will run out if the optical splitter module is tilted or tuned upside down. Also, there will be less improvement in the humidity resistance of the optical splitter module so that the optical axis between the optical fibers 41, 42 will be more easily misaligned in high-temperature, high-humidity tests. Also, application of external pulling or bending force to the optical fibers 41, 42 will cause these forces to act directly on the ends of the optical fibers, leading to the optical fibers breaking easily. Other problems include increased reflection of light in the structure shown in FIG. 3B due to bubbles formed between the optical fibers 41, 42 and the optical waveguide 32. Thus, these optical splitter modules based on FIGS. 3A and 3B are not suited for practical use, without use of the intermediate layer 33.

As described above, in an optical module with an optical waveguide formed from a resin containing at least some fluorine, a silicone-based resin being present in at least a section of the upper part of the optical waveguide, the intermediate layer described above is interposed between the optical waveguide and the silicone-based resin. This prevents inhibition to the setting of the silicone-based resin and allows a highly reliable optical module to be provided.

If the fluorine content is 10% or more, the setting becomes clearly inadequate, but a fluorine content of less than 10% can reduce reaction with the silicone-based resin such as inadequate setting. Thus, the above embodiments of the present invention provide an optical module that can reduce inhibition to the setting of the silicone-based resin.

Although the above functionality has generally been described in terms of specific hardware and software, it would be recognized that the invention has a much broader range of applicability. For example, the software functionality can be further combined or even separated. Similarly, the hardware functionality can be further combined, or even separated. The software functionality can be implemented in terms of hardware or a combination of hardware and software. Similarly, the hardware functionality can be implemented in software or a combination of hardware and software. Any number of different combinations can occur depending upon the application.

Many modifications and variations of the present invention are possible in light of the above teachings. Therefore, it is to be understood that within the scope of the appended claims, the invention may be practiced otherwise than as specifically described.

The preceding has been a description of the preferred embodiment of the invention. It will be appreciated that deviations and modifications can be made without departing from the scope of the invention, which is defined by the appended claims.

What is claimed is:

1. An optical module, comprising:
   an optical waveguide formed from a first resin, said first resin comprising fluorine;
   a section above said optical waveguide, comprising a silicone-based resin; and
   a metal film interposed between said optical waveguide and said silicone-based resin.

2. The optical module of claim 1 wherein said first resin is a polyimide.

3. The optical module of claim 1, wherein said metal film comprises at least one type of metal selected from the group consisting of Al, Ti, Ta, Cr, Mo, W, Mn, Fe, Ni, Cu, Pt, and Au.

4. An optical module, comprising:
   an optical waveguide formed from a first resin, said first resin comprising fluorine;
   a section above said optical waveguide, comprising a silicone-based resin; and
   an inorganic film interposed between said optical waveguide and said silicone-based resin.

5. The optical module of claim 4 wherein said first resin is a polyimide.

6. The optical module of claim 4, wherein said inorganic film comprises a dielectric compound.

7. The optical module of claim 4, wherein said inorganic film comprises silicon or a silicon compound.

8. The optical module of claim 4, wherein said inorganic film comprises at least one material selected from the group consisting of Si, SiO2, Si3N4, Ta2O5, and Al2O3.

9. An optical module, comprising:
   an optical waveguide formed from a first resin, said first resin comprising fluorine;
   a section above said optical waveguide, comprising a silicone-based resin; and
   an intermediate resin layer comprising substantially 0% fluorine interposed between said optical waveguide and said silicone-based resin.

10. The optical module of claim 9 wherein said first resin is a polyimide.

11. An optical module, comprising:
    an optical waveguide formed from a first resin, said first resin comprising fluorine;
    a section above said optical waveguide, comprising a silicone-based resin; and
    a second resin comprising fluorine content of less than 10% total weight interposed between said optical waveguide and said silicone-based resin.

12. The optical module of claim 11, wherein the fluorine content of said second resin is further limited to 5% or less of the total weight.

13. The optical module of claim 12, wherein said second resin is selected from a group consisting of thermosetting resin, ultraviolet-setting epoxy-based resin, acrylic-based resin, polyetherimide-based resin, polysulfone-based resin, polyethersulfone-based resin, polyvinylacetal-based resin, polyimide-based resin, polyimide-based resin, polyether ether ketone-based resin, a positive or negative photosensitive resist material and a polyimide-based resin.

14. The optical module of claim 12, wherein said second resin is any resin providing adequate heat resistance for a standard reliability test of about 2000 hours at about 85 degrees Celsius.

15. The optical module of claim 11 wherein said first resin is a polyimide.

16. The optical module of claim 11 wherein said optical module is used for optical communications.

17. The optical module of claim 11 wherein said optical module is a light transmitting module.

18. The optical module of claim 11 wherein said optical module is an optical splitter module.

19. The optical module of claim 9 wherein the intermediate resin layer is a polyimide formed from a repeating unit having the formula:

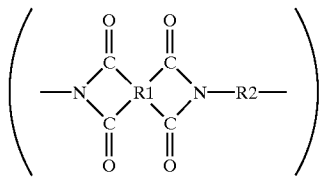

wherein

R1 is at least one of the tetravalent organic groups selected from the group consisting of the formulas:

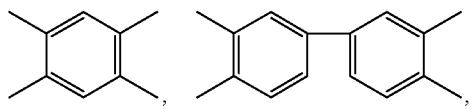

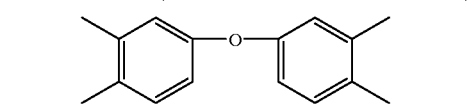

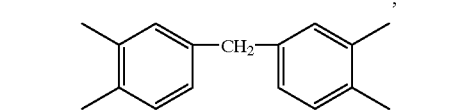

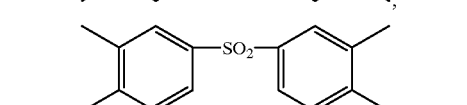

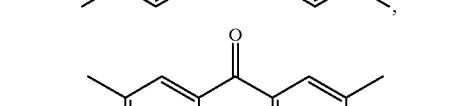

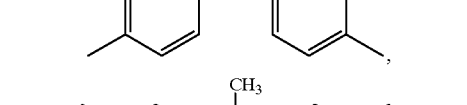

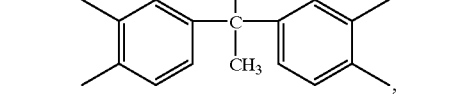

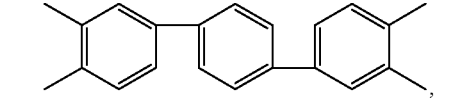

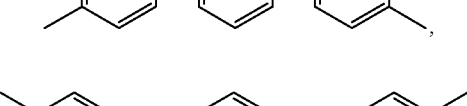

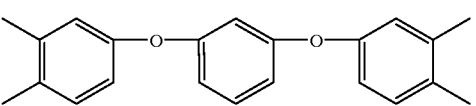

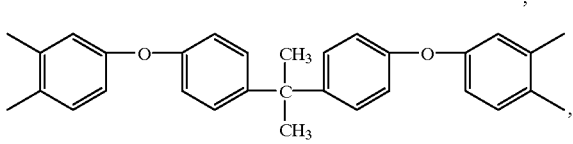

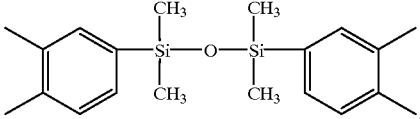

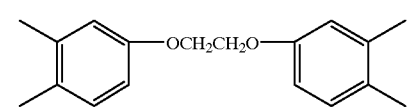

and wherein R2 is at least one of the divalent organic groups selected from the group consisting of the formulas:

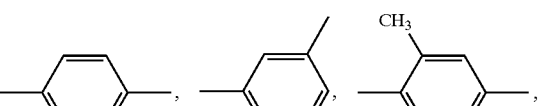

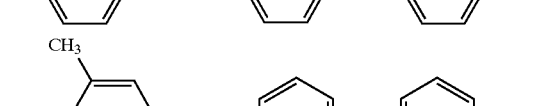

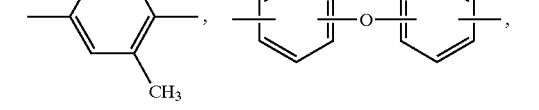

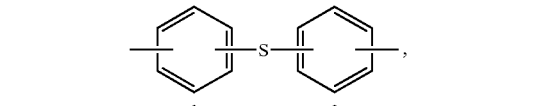

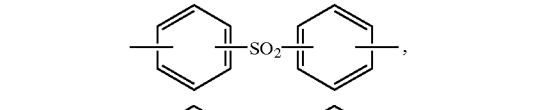

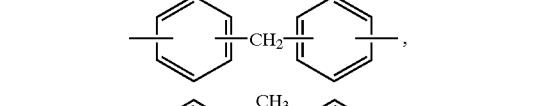

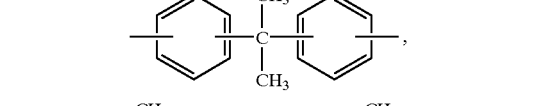

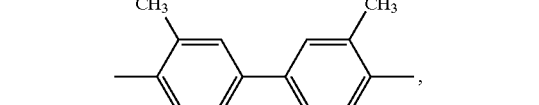

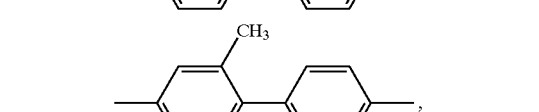

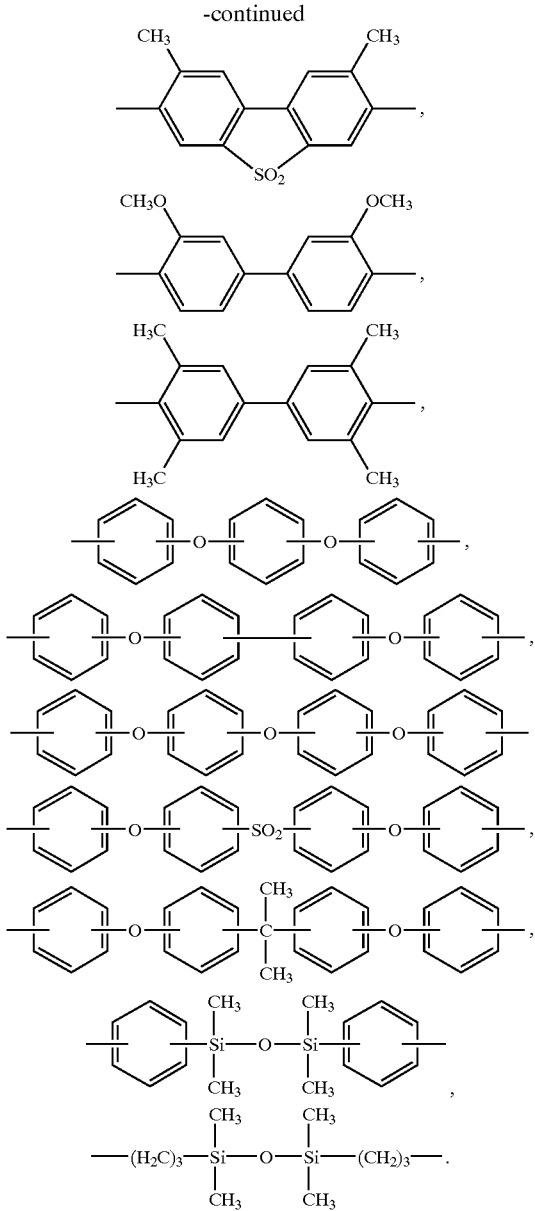

20. A method for producing an optical module for use in optical communications, said method comprising:
    forming an optical waveguide comprising a resin, said resin comprising fluorine;
    forming above said optical waveguide, an intermediate layer comprising less than 10% fluorine; and
    forming a covering layer above said an intermediate layer, said covering layer comprising a silicone-based resin.

21. The method of claim 20 wherein said waveguide comprises a cladding layer and a core layer, said cladding layer comprising fluorine.

22. The method of claim 21 wherein said intermediate layer is between said cladding layer and said silicone-based resin.

23. The method of claim 20 wherein said intermediate layer has substantially 0% fluorine.

24. A method for producing an optical module for use in optical communications, said method comprising:
    forming an optical waveguide comprising a resin, said resin comprising fluorine;
    applying above said optical waveguide, an intermediate layer comprising material formed from a group consisting of a metal film, a dielectric film, or a film comprising silicon; and
    applying a covering layer above said optical waveguide, said covering layer comprising a silicone-based resin.

25. A method of sealing using a silicone based resin over a first layer, comprising fluorine, of an optical module, said method comprising:
    forming a second layer over said first layer, wherein said second layer comprises little or no fluorine;
    applying said silicon based resin over said second layer; and
    setting said silicon based resin by heating.

26. The method of claim 25 wherein said second layer is formed by sputtering Cr.

27. The method of claim 25 wherein said second layer is cleaned using ultraviolet light or plasma ashing.

28. A system for producing an optical module, comprising a polymer-based optical waveguide,
    a waveguide forming module for forming said polymer-based optical waveguide, said polymer-based optical waveguide comprising a resin, said resin comprising fluorine;
    an intermediary layer module for applying a material above said polymer-based optical waveguide; and
    a resin sealing module for applying a silicone-based resin above said intermediary layer.

29. The system of claim 28 wherein said material comprises a metal.

30. The system of claim 28 wherein said material comprises a dielectric.

31. The system of claim 28 wherein said material comprises silicon.

32. The system of claim 28 wherein said material comprises a silicon compound.

33. The system of claim 28 wherein said material comprises a fluorine content of less than ten percent.

34. A system, comprising a plurality of processors and a plurality of memories, said plurality of memories comprising software for producing an optical module, wherein said optical module comprises an optical waveguide, said system comprising:
    an optical waveguide module for forming said optical waveguide from a first resin, said first resin comprising fluorine;
    an intermediate layer module for forming a layer above said optical waveguide; and
    a sealing resin module for applying a silicone-based resin above said layer.

35. The system of claim 34 wherein said layer is selected from a group consisting of a metal, a dielectric, an inorganic compound, or a second resin having a fluorine content of less than 10 percent.

36. A plurality of computer readable media for storing code for making an optical module, comprising:
    code for forming an optical waveguide from a first resin, said first resin comprising fluorine;
    code for forming an intermediary layer above said optical waveguide; and
    code for forming a silicone-based resin layer above said intermediary layer.

37. The plurality of computer readable media of claim 36 wherein said intermediary layer is selected from a group consisting of a metal, a dielectric, an inorganic compound, or a second resin having a fluorine content of less than 10 percent.

38. A system for making an optical module, comprising:
- means for forming an optical waveguide from a first resin, said first resin comprising fluorine;
- means for forming an intermediary layer above said optical waveguide; and
- means for forming a silicone-based resin layer above said intermediary layer.

39. The computer system of claim 38 wherein said intermediary layer is selected from a group consisting of a metal, a dielectric, an inorganic compound, or a second resin having a fluorine content of less than 10 percent.

40. An optical module, comprising:
- an optical waveguide formed from a first resin, said first resin comprising fluorine;
- an intermediary layer above said optical waveguide; and
- a silicone-based resin layer above said intermediary layer.

41. The optical module of claim 40 wherein said intermediary layer is selected from a group consisting of a metal, a dielectric, an inorganic compound, or a second resin having a fluorine content of less than 10 percent.

* * * * *